Sept. 6, 1966   C. H. HAAKE ET AL   3,271,668
MICROWAVE MEASUREMENT OF SURFACE ATTRITION OF A DIELECTRIC BODY
Filed Aug. 23, 1962
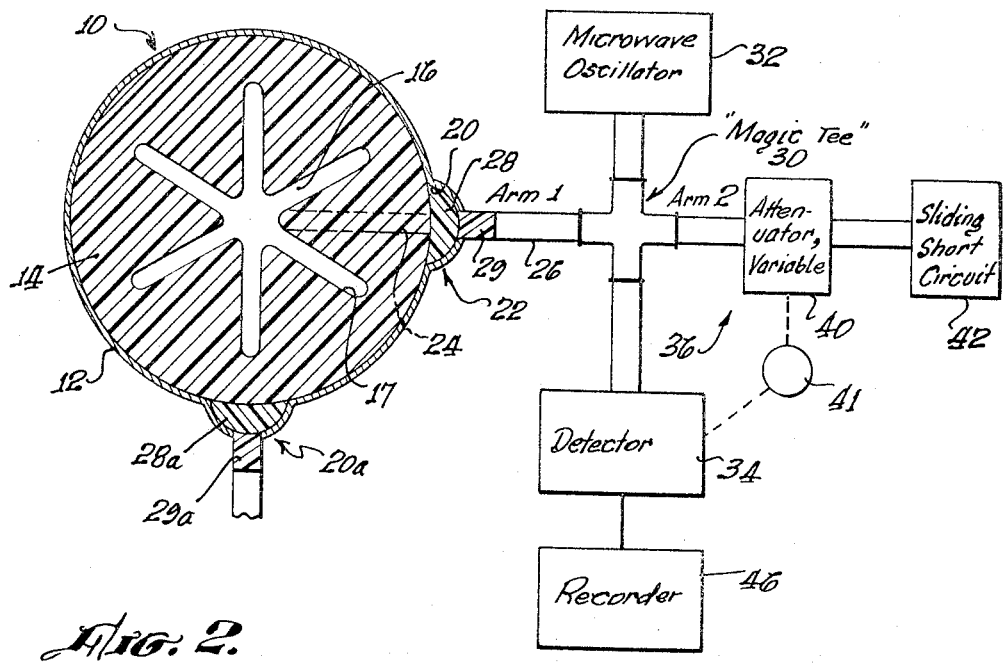
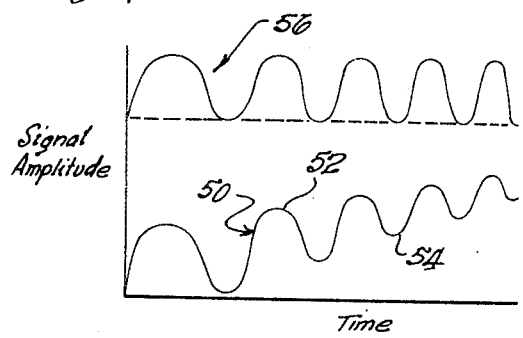
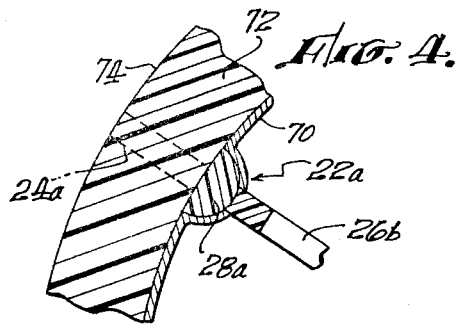
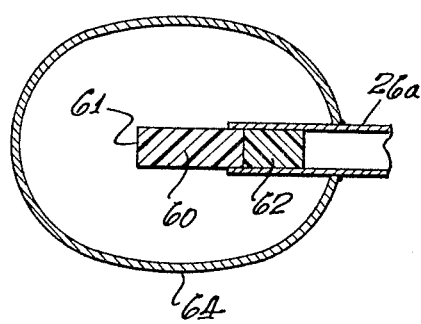
CLAUS H. HAAKE,
SAMUEL THOMAS WORKMAN,
DONALD L. JOHNSON,
INVENTORS.
BY
Barksdale & Lewis United States Patent Office 3,271,668
Patented Sept. 6, 1966

3,271,668
MICROWAVE MEASUREMENT OF SURFACE ATTRITION OF A DIELECTRIC BODY
Claus H. Haake, Altadena, Samuel T. Workman, Glendora, and Donald L. Johnson, West Covina, Calif., assignors to Giannini Controls Corporation, Duarte, Calif., a corporation of New York
Filed Aug. 23, 1962, Ser. No. 218,874
4 Claims. (Cl. 324—58.5)

This invention has to do with the measurement of dynamic changes in the geometrical configuration of solid bodies of dielectric material caused by removal of material from a surface. The methods of the invention are applicable to many different types of measurement, including in particular the rate of ablation of dielectric nose cones of missiles and the like, and the determination of the rate of combustion of dielectric materials such as are used as rocket propellants. For clarity of description, but without intending any limitation upon its scope, the invention will be described primarily with relation to those uses.

It is highly desirable to measure accurately the burning rate of rocket propellants, not only for relatively small samples, as for the purpose of developing improved compositions; but also to determine the burning profile in an actual rocket motor, as for testing and improving its structural configuration.

Accurate measurement of the propellant burning rate is difficult, since the burning surface is inaccessible to ordinary instruments. Moreover, the intense radiation from the burning surface interferes with ordinary optical techniques.

Techniques have been proposed for indicating the time at which combustion reaches certain discrete points within the body of the propellant, for example by embedding a system of electric wires in the propellant and noting the times at which the respective circuits are opened by physical destruction of the wires. The serious limitations and difficulties of such techniques are obvious.

It has also been proposed to measure burning rate in rocket motors by passing X-rays through the engine and measuring changes in the transmitted intensity. Even aside from the hazards and expense of such methods, they are clearly incapable of distinguishing differences in burning rate on the two sides of the motor.

Another known technique is to extinguish combustion in a motor and measure the remaining fuel. That procedure can establish only a single profile, and depends upon the unproved assumption that the time of flame extinction is the same throughout the motor.

An important object of the present invention is to provide a method of measuring the rate of attrition of material such as solid propellant in an effectively continuous manner, whereby relatively small and rapid fluctuations in rate are readily detectable.

A further object of the invention is to permit burning rate measurements during static tests of actual rocket structures with a minimum of special instrumental modification of the rocket.

These and other objects of the invention are accomplished in accordance with the present invention by reflecting from the burning surface electromagnetic radiation in the frequency range commonly designated as microwave radiation. That radiation is directed at the burning surface through the solid body of the propellant, and is also received through the body of the propellant after internal reflection from the surface. With that arrangement, the path length in the body of the propellant varies continuously during combustion of the propellant, and can provide an accurate and convenient measure of the actual burning rate.

The invention is especially useful in connection with the many well known solid rocket propellants that employ a finely divided oxidizable component dispersed in a binder having the nature of a plastic. In some instances the plastic binder also serves as oxidizer. In other instances the oxidizer is also a finely divided solid dispersed in the binder as an intimate mixture with the oxidant.

Variation of the radiation path length in the body of the propellant or other material to be measured may be detected in any suitable manner. In accordance with one aspect of the invention, the relative phase of the incident and reflected radiation is detected, and variations in that relative phase are utilized as a measure of the change in path length produced by the combustion. For example, the incident and reflected radiation may both be contained in a common conductor, such as a wave-guide, so that standing waves are produced at positions in that conductor that vary with the length of the radiation path in the propellant body. The change of position of the standing wave minima is a measure of the change in path length within the body and hence of the rate of dimensional change of the body due to combustion or other cause. Variation of the standing wave configuration can be detected, for example, in conventional manner by use of a slotted waveguide and a movable probe. If desired, the probe can be stationary and the times at which standing wave minima and maxima pass the probe can be measured. In preferred form of the invention, a bridge technique is employed, utilizing an adjustable reference arm and comparing the standing wave configurations in the described common conductor with that in the reference arm. Such a bridge may utilize a so-called magic Tee or equivalent device for introducing the input radiation and supplying output relative phase information to a detection device.

In accordance with a further aspect of the invention, amplitude balance may be maintained between the working and control arms of the bridge as the path through the propellant becomes shorter by progressively decreasing the attenuation in the control arm at the proper rate.

The method of the invention is applicable to other types of surface attrition of solid dielectric material, as, for example, the ablation of material from the outer surface of a ceramic nose cone of a missile.

A full understanding of the invention, and of its further objects and advantages, will be had from the following description of certain illustrative manners of carrying it out. The particulars of that description, and of the accompanying drawings which form a part of it, are intended only as illustration and not as a limitation upon the scope of the invention, which is defined in the appended claims.

In the drawings:

FIG. 1 is a schematic drawing representing an illustrative embodiment of the invention;

FIG. 2 is a graph representing typical output data in accordance with the invention;

FIG. 3 is a fragmentary schematic drawing representing a modification; and

FIG. 4 is a fragmentary schematic section representing another embodiment of the invention.

In FIG. 1 a rocket combustion chamber is represented somewhat schematically at 10, with cylindrical chamber wall 12 and solid propellant charge 14. Charge 14 typically fills the main portion of the chamber except for the central open volume 16, which extends axially and is of any desired form, being shown illustratively of starsection. Combustion is initiated in known manner at the free surface 17 formed between that volume and the body of the propellant, and proceeds from that surface toward the shell 12. Thus, the thickness of the propellant body, measured from the case to the free surface 17, becomes progressively less as the burning proceeds.

In accordance with one aspect of the present invention, the metal side wall of case 12 is apertured at 20, and a directional antenna structure is provided in position to project a beam of microwave radiation through the aperture into the body of propellant 14. The aperture 20 is physically sealed by a window 28 of dielectric material capable of transmitting microwave energy and withstanding the internal pressure that results from motor operation. Such antenna structure is indicated schematically at 22 in the illustrative form of a parabolic antenna, but it is to be understood that many different types of antenna structure are well known and may be employed for this purpose. Antenna 22 projects a microwave beam into the propellant, as indicated schematically at 24. A portion of that microwave energy is reflected back from the free propellant surface 17, and is received by the antenna. In the present embodiment the same antenna structure is employed to project the beam 24 and to receive the reflected radiation. However, separate suitably positioned antenna structures may be employed for those two purposes, if preferred. Additional antennas may be provided, if desired, as indicated at 20a, positioned to project radiation to various parts of the surface 16. Measurements may be made at a selected position, or the auxiliary mechanism to be described may be duplicated to the extent needed to measure simultaneously at a plurality of positions.

Microwave power is supplied to antenna 22 via a suitable conductor 26, shown illustratively as a conventional waveguide, and the reflected microwave power is received by that same waveguide. Means of any desired type are provided for detecting the phase relations between the incident and reflected radiation. In particular, the incident and reflected waves set up standing waves in the conductor 26. The precise position of those standing waves depends upon the position of interface 16. More specifically, those standing waves exhibit alternating maximum and minimum electric field intensities at longitudinal intervals of one-quarter wavelength from the interface. Hence, as the surface at 16 burns, these maxima and minima vary in position along the waveguide by a corresponding distance.

The movement of such maxima and minima can be followed in known manner, as by suitably fixed probe structure or by means of a slotted waveguide and movable probe. In the present preferred embodiment of the invention, conduit 26 is coupled by means of a "magic Tee" 30 to a source of microwave energy, represented schematically as the microwave oscillator 32, to a detector 34, and to a reference arm 36. The latter arm typically comprises a variable attenuator 40 and a longitudinally adjustable termination 42 that acts as a short across the line at a variable position. Each of those elements in itself is well known, and its detailed construction need not be described here. The magic Tee 30 is so connected that input energy from oscillator 32 is divided between arm 26 and reference arm 36; and that when the standing wave patterns in those two arms are balanced, zero energy is supplied to detector 34. Any unbalance between the standing wave patterns in the two arms, such as can be produced for test purposes by shifting termination 42, for example, produces an output from the detector.

With that arrangement, the bridge system is typically initially brought into balance as to phase by shifting termination 42, and as to amplitude by adjustment of attenuator 40 until substantially zero signal is obtained at 34. Then, as the propellant charge 14 burns, that balance is alternatively disturbed and re-established with respect to phase, producing at the detector a succession of maxima that correspond to respective peaks of the standing wave pattern and are spaced in time in inverse proportion to the rate of progress of the combustion.

The output from detector 34 is preferably supplied, after suitable amplification to a recorder, which may be of conventional type, indicated schematically at 46, which records the amplitude as a function of time. The resulting pattern is then typically as shown at 50 in FIG. 2. The maxima 52 of curve 50 represent conditions of maximum unbalance between the two arms of the bridge. As the propellant burns and the path length within it becomes less, the radiation absorption in the propellant decreases correspondingly, causing a progressive unbalance of the bridge with respect to amplitude. That causes the minima of curve 50 to depart progressively from zero amplitude, as at 54, for example, and also tends to make the swings between maxima and minima appear smaller despite the decreasing absorption. Those effects can be largely avoided by continuously adjusting attenuator 40 during the period of burning to maintain approximate balance of the reflected amplitudes in the two arms of the bridge. The detector amplification may also be adjusted continuously if desired.

If desired, such adjustment of the amplification and of the attenuator in the reference arm, or its equivalent, may be driven automatically in the required manner, as by the motor and cam system indicated schematically at 41. The output pattern is then typically as indicated schematically at 56, in which the distance between maxima or minima represents the time required for the burning to progress one quarter wavelength in the propellant. The wavelength in the propellant can be determined for calibration purposes by conventional measuring techniques. Measurements of curve 56 between corresponding points of two cycles, or interpolation within a cycle, then gives an accurate measure of the actual burning rate. The phase adjustment of the reference arm at 42 may also be servo-driven to maintain the bridge in balance with respect to phase; and the position of that adjustment then provides a continuous and direct indication of the progress of the combustion.

It is often useful to test the burning rate of a relatively small sample of propellant. That may be accomplished, in accordance with a further aspect of the invention, by providing a sample in the form of a rod, typically but not necessarily of rectangular section, of suitable dimensions to act as a dielectric waveguide for microwave radiation of the selected wavelength. That rod is mounted at the open end of a waveguide of conventional type, preferably with a suitable impedance transformer to reduce the reflection of energy at the junction. Such a waveguide is indicated in FIG. 3 at 26a, and is typically connected to auxiliary apparatus such as that shown in FIG. 1, taking the place of waveguide section 26 of that figure. In FIG. 3 the rod of propellant is represented at 60, and the numeral 62 represents a suitable transformer, typically comprising a block of material one-quarter wavelength long and having dielectric constant equal substantially to the square root of that of the propellant 60. The propellant sample 60 and a portion of waveguide 26a may be enclosed in a pressure vessel, indicated schematically at 64, to confine the combustion products and simulate the pressure of an actual rocket engine.

With the arm 26 and rocket combustion chamber 10 of FIG. 1 replaced by the structure of FIG. 3, the principle of operation of the system is essentially as already described. Radiation entering waveguide 26a is reflected from the end 61 of propellant sample 60, producing standing waves within the waveguide section which are detected, typically as already described. Those standing waves are shifted longitudinally in direct response to the burning of the face 61 of the sample. Burning may be confined essentially to that face in the same manner as in conventional burning rate determinations, for example by coating the adjacent faces of the sample with a suitable insulator of known type.

A further illustrative example of the utility of the present invention relates to measurement of the rate of ablation of material from the surface of the nose cone of a missile on reentry into the atmosphere. In FIG. 4, a metallic portion of the conventional nose cone structure is indicated schematically at 70, with a protective layer 72 of material capable of resisting high temperatures. The latter material is typically a ceramic having dielectric properties. In accordance with the invention a window 28a of structural dielectric material is provided, if necessary, in wall 70 and a microwave antenna structure is mounted as at 22a in position to project a beam 24a of radiation through the material 72 toward its outer surface 74. That beam is partially reflected from that surface, in the manner already described in connection with FIG. 1. Reflected energy is received by antenna 22a, setting up standing waves within the waveguide section 26b. Variations in the positions of those standing waves in the waveguide are detected, as by the means already described in connection with FIG. 1. During actual reentry of the nose cone into the atmosphere, or during test operations, as in a wind tunnel, for example, accurate measurements can thus be made of the progressive attrition of the surface 74. Those measurements are carried out at a well-defined position, and without interfering with the normal flow of air over the nose cone.

We claim:

1. The method of measuring the rate of progressive attrition from a surface of a body of solid dielectric material, said method comprising
   injecting electromagnetic radiation of microwave frequency into the body in a direction to be internally reflected from the said surface,
   receiving radiation reflected from the surface,
   and detecting the variations in the relative phase of the injected and reflected radiation that result from attrition at the surface.

2. The method of measuring the rate of propagation of combustion at a burning surface of a body of solid rocket propellant, said method comprising
   injecting electromagnetic radiation of microwave frequency into the body of the propellant in a direction to be internally reflected from the burning surface thereof,
   receiving radiation reflected from said surface,
   and detecting variations in the relative phase of the injected and reflected radiation in response to propagation of the combustion.

3. A rocket testing system, comprising in combination
   structure forming a rocket combustion chamber having a wall portion of dielectric material,
   a body of solid propellant within the chamber overlying the wall portion and having a free surface opposing the wall portion,
   means for initiating combustion at said surface,
   means for projecting an incident beam of electromagnetic radiation of microwave frequency through said wall portion into the body of propellant in a direction to be internally reflected from said surface,
   and means for comparing the phase of the incident and reflected radiation to detect attrition of said surface during combustion of the propellant.

4. A system for detecting ablation of the outer surface of a heat shield of dielectric material on the nose cone of a reentry vehicle, said system comprising in combination
   a reentry vehicle having a heat shield of dielectric material,
   means for injecting electromagnetic radiation of microwave frequency outwardly into the heat shield in a direction to be internally reflected from the outer surface of said heat shield,
   means for receiving radiation reflected from said surface,
   and means for detecting variations in the relative phase of the injected and reflected radiation.

References Cited by the Examiner

UNITED STATES PATENTS

| 2,491,418 | 12/1949 | Schlesman | 324—58.5 X |
| 2,611,804 | 9/1952 | Zaleski | 324—58.5 |
| 2,630,472 | 3/1953 | McArthur | 324—58.5 |
| 2,697,208 | 12/1954 | Houghton | 324—58 X |
| 2,798,197 | 7/1957 | Thurston | 324—58.5 |
| 2,952,296 | 9/1960 | Kofoid | 324—58.5 X |

WALTER L. CARLSON, *Primary Examiner.*

A. E. RICHMOND, *Assistant Examiner.*